Figure 1:
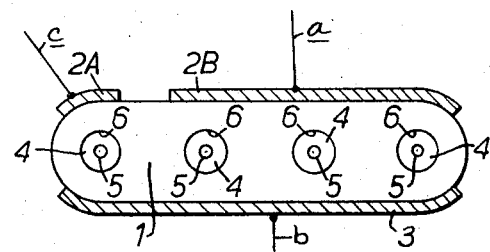

United States Patent [19]
Cooper

[11] 3,784,849
[45] Jan. 8, 1974

[54] DEVICES INCORPORATING CAVITY RESONATORS

[75] Inventor: Brian Frederick Cooper, Chelmsford, England

[73] Assignee: English Electric Valve Company Limited, Chelmsford, England

[22] Filed: July 28, 1972

[21] Appl. No.: 276,093

[30] Foreign Application Priority Data
Aug. 26, 1971 Great Britain.................. 40,034/71

[52] U.S. Cl...................... 310/8.2, 310/8.5, 310/9.6, 310/9.8, 315/39.55, 331/155
[51] Int. Cl.............................................. H04r 17/00
[58] Field of Search...................... 310/8.1, 9.8, 8.2, 310/8.5, 8.6, 9.6; 315/39.55; 331/155

[56] References Cited
UNITED STATES PATENTS

| | | | |
|---|---|---|---|
| 3,381,149 | 4/1968 | Wiggins et al. ................. | 310/9.8 X |
| 3,117,189 | 1/1964 | Kopp ............................... | 310/9.8 X |
| 2,841,722 | 7/1958 | Gravley ........................... | 310/9.8 X |
| 3,478,247 | 11/1969 | Hull ................................. | 310/8.1 X |
| 2,463,472 | 3/1949 | Bach ............................... | 331/115 X |
| 3,478,246 | 11/1969 | Perkins et al. .................. | 315/39.55 |

Primary Examiner—J. D. Miller
Assistant Examiner—Mark O. Budd
Attorney—Donald M. Wight et al.

[57] ABSTRACT

A device incorporating a cavity resonator and in which there is employed a transducer for controlling a conductive member and a further transducer subject to the same strain as the controlling transducer whereby the further transducer produces on an external terminal or lead a low frequency signal representative of the deflection of the controlling transducer.

4 Claims, 2 Drawing Figures

DEVICES INCORPORATING CAVITY RESONATORS

This application relates to subject matter disclosed in my copending application Ser. No. 166,934, filed July 28, 1971, and now U. S. Pat. No. 3,727,097.

This invention relates to devices incorporating cavity resonators, such as magnetrons, of the kind in which tuning is effected by the movement of a conductive member under the control of a transducer. The object of the invention is to provide improved such cavity resonators.

According to this invention a device incorporating a cavity resonator, of the kind referred to, includes means directly responsive to the deflection of said transducer for producing on an external terminal or lead of said resonator a low frequency signal representative of said deflection.

The term "low frequency" as used herein includes d.c.

This deflection representative signal will depend upon the actual deflection produced by the transducer itself as a result of a tuning signal applied thereto and may be used to provide an indication of the frequency to which the resonator is tuned.

Preferably the said responsive means is itself a transducer which is arranged to be subjected to the same strain as the transducer controlling said conductive member.

Where said transducer controlling said conductive member is of the kind where two electrodes are provided on opposite faces of piezo-electric or other suitable material preferably one of said electrodes is divided longitudinally, one portion being arranged to have tuning control signals applied thereto, as before, whilst the other portion has a connection thereto by which voltage dependent upon the strain set up in the transducer material due to deflection thereof may be passed to said external terminal or load. In effect, that part of the transducer involving the other portion of said one electrode acts in the manner of a strain gauge.

In an embodiment of the invention in which two transducers are employed, which extend substantially parallel to one another to support the tunning member, a further transducer is situated between the aforementioned two transducers, tuning control signals being arranged to be applied to said first mentioned two transducers and means being provided for taking off voltage from said further transducer which represents the strain set up in all three transducers when tuning control signals are applied to said first mentioned two transducers.

It will be noted that the deflection representative signal produced on the external lead or terminal is representative of true deflection of the tuning transducer which deflection may be attributable not only to the tuning control signals applied to the tuning transducer, but also to any extraneous effects, such as mechanical vibrations. The deflection representative signal provided by the present invention may be utilised to compensate for undesired deflection of said tuning transducer due to such extraneous effects by, for example feeding the provided signal through an electrical network and an amplifier to adjust its phase and amplitude and feeding the resultant signal back to the tuning transducer to reduce the said undesired deflection.

The invention is further described with reference to the accompanying drawings in which:-

Figure 2:
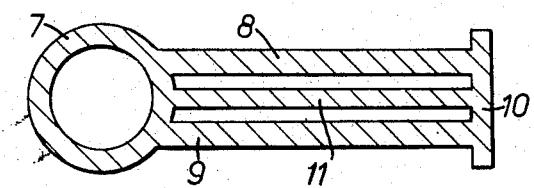

FIG. 1 is a cross-section through a transducer of multimorph construction employed in one magnetron in accordance with the present invention and, FIG. 2 is a plan view of a transducer and tuning member arrangement used in another example of a magnetron in accordance with the present invention.

The detailed construction of the magnetrons to be described with reference to FIGS. 1 and 2 is not shown. The detailed construction may, however, be taken to be similar to that described in my co-pending application Ser. No. 166,934, now U.S. Pat. No. 3,727,097 issued Apr. 10, 1973 and claiming priority of U K specification No. 38081/70 and may or may not include the means for shielding otherwise exposed regions of piezoelectric material forming the transducer from the cathode with which that co-pending application is concerned.

Referring to FIG. 1, in this example of transducer a piezo-electric ceramic body 1 is provided with an upper electrode comprised of two electrically isolated portions 2A and 2B and a lower electrode 3. Within the piezo-electric body 1 are longitudinally extending holes 6 which contain conductors 5. The otherwise free space between the conductor 5 and the internal wall of its hole 6 is occupied by graphite material 4. As so far described the transducer is known per se. In accordance with the preferred feature of the present invention, however, the upper electrode is divided longitudinally into two electrically isolated portions 2A and 2B. Portion 2B is arranged, as before, to having tuning deflection control voltages applied to it by means of the wire connections a and b whilst portion 2A, which as shown may be of other much narrower width than the portion 2B is arranged to have voltages derived from it by means of a wire connection c taken through to a terminal on the exterior of the magnetron. The portion of the transducer of FIG. 1 involving the electrode portion 2A in fact acts as a strain gauge to produce a voltage which is dependent upon strain set up in the transducer material body 1 when deflected.

Referring to FIG. 2, in this case the tuning member 7 is carried at the ends of two parallel transducers 8 and 9. Transducers 8 and 9 extend from a common member 10. Interposed between transducers 8 and 9 and also extending from the common member 10 to the tuning member 7 is a further transducer 11. Transducers 8 and 9 are arranged to have tuning control signals applied to them whilst transducer 11 is arranged to be utilised solely as a strain sensing member to produce a voltage which is dependent upon the strain set up in both it and the two transducers 8 and 9 due to the tuning control signals applied to these last mentioned two transducers.

I claim:

1. In a microwave device including a resonant cavity, a piezoelectric transducer arm disposed adjacent said cavity, first terminal means connected to said transducer arm for enabling tuning signals to be applied to cause the transducer arm to flex and a conductive tuning member mounted on said transducer arm and arranged to move in response to the flexing of the transducer arm and thereby change the resonant frequency of the resonant cavity, the combination of deflection responsive means having further terminal means to produce at said further terminal means a low frequency signal representative of the deflection caused by the flexing of said transducer arm.

2. A device as claimed in claim 1 wherein said deflection responsive means is a piezoelectric transducer mounted so as to be subject to the same strain as said piezoelectric transducer arm.

3. A device as claimed in claim 1 wherein said piezoelectric transducer arm comprises a transducer body of piezoelectric material having opposite first and second faces, first and second electrodes disposed respectively on said opposite faces and respectively connected to first and second terminals constituting said first terminal means there being provided a third electrode disposed on one said opposite faces and electrically connected to said further terminal means for providing said low frequency signal.

4. A device as claimed in claim 1 wherein said piezoelectric transducer arm comprises first and second piezoelectric transducers arranged substantially parallel to one another and electrically connected in parallel to said first terminal means there being provided a third piezoelectric transducer mounted between said first and second transducers and electrically connected to said further terminal means, said first, second and third transducers being disposed in parallel so as to be subject to the same mechanical deflection.

* * * * *